(12) United States Patent
Lee

(10) Patent No.: US 6,568,256 B1
(45) Date of Patent: May 27, 2003

(54) SYSTEM AND METHOD FOR CONTROLLING AN AUTOMATIC FOUR-WHEEL DRIVE TRANSFER CASE WHICH PREVENTS EXCESSIVE SLIPPAGE

(75) Inventor: Syun Kyung Lee, Ann Arbor, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 512 days.

(21) Appl. No.: 09/636,183

(22) Filed: Aug. 10, 2000

(51) Int. Cl.[7] .............................................. G01M 19/00
(52) U.S. Cl. ..................................................... 73/118.1
(58) Field of Search ............................... 73/116, 118.1, 73/118.2, 119 R; 74/665, 425, 333

(56) References Cited

U.S. PATENT DOCUMENTS

| | | | | |
|---|---|---|---|---|
| 4,849,899 A | * | 7/1989 | Cote et al. ..................... | 73/18.1 |
| 5,117,791 A | * | 6/1992 | Chan et al. .................. | 73/118.1 |
| 5,409,432 A | * | 4/1995 | Steeby ..................... | 364/424.1 |
| 5,593,176 A | * | 1/1997 | Campbell et al. ........... | 280/707 |
| 6,131,454 A | * | 10/2000 | Kopp et al. .................... | 73/117 |

* cited by examiner

Primary Examiner—Eric S. McCall
Assistant Examiner—Maurice Stevens
(74) Attorney, Agent, or Firm—F. G. McKenzie

(57) ABSTRACT

A method and system 10 for controlling a transfer case 32 of a four-wheel drive vehicle 12. The vehicle 12 includes a front driveshaft 22 and a rear driveshaft 26. Transfer case control system 10 includes a conventional microcontroller or controller 40 having a memory unit 42 and operating under stored program control. Controller 40 is communicatively coupled to sensors 44, 46, 47, to a driver-operated control 48, and to a transfer case clutch 38. Controller 40 operates transfer case 32 in several modes including an automatic four-wheel drive mode and a "locked" four-wheel drive high mode. Controller 40 estimates the amount of heat generated by clutch 38 by monitoring the difference in the speed between driveshafts 22 and 26 and by monitoring the position of the vehicle's throttle. Controller 40 automatically shifts from the automatic four-wheel drive mode to the locked four-wheel drive high mode when the estimated amount of heat exceeds a certain threshold level.

20 Claims, 3 Drawing Sheets

SYSTEM AND METHOD FOR CONTROLLING AN AUTOMATIC FOUR-WHEEL DRIVE TRANSFER CASE WHICH PREVENTS EXCESSIVE SLIPPAGE

FIELD OF THE INVENTION

This invention relates to a system and a method for controlling a transfer case and more particularly, to a system and a method for controlling an automatic four-wheel drive transfer case which detects a condition of excessive heat generation within the transfer case, and which shifts the transfer case into a locked four-wheel drive mode in response to such a detection, thereby preventing potential damage and wear to the transfer case clutch.

BACKGROUND OF THE INVENTION

Four-wheel drive vehicles typically include a transfer case which selectively transfers torque and power from the vehicle's input shaft to a front and a rear driveshaft, thereby selectively rotating the front and rear driveshafts.

In four-wheel drive systems having an "automatic" or "on-demand" drive mode, both the front and rear pairs of wheels are continually in drivable engagement with the transfer case, but substantially all of the torque is transferred to one pair of wheels when no slippage is detected. When a slippage is detected, the transfer case selectively transfers torque from a primary driveshaft (e.g., the rear driveshaft) to a secondary driveshaft (e.g., the front driveshaft), thereby reducing the torque provided to the primary driveshaft and increasing the torque provided to the secondary driveshaft. Hence, in this type of system, torque is transferred in a mode substantially similar to a two-wheel drive vehicle until slippage is detected.

A controller and/or control system determines the amount of torque that is to be provided to the rear and front driveshafts (e.g., primary and secondary driveshafts) based upon vehicle sensory data, and generates a control or command signal to the transfer case, thereby controlling the amount of torque which is provided to the rear and front driveshafts.

For example and without limitation, when the speed of the front driveshaft or front wheels differs from the speed of the rear driveshaft or rear wheels by a certain amount or "error", these prior systems alter or change the value of the control or command signal to provide more or less torque to the front and/or to the rear driveshaft in order to substantially prevent and/or reduce the likelihood of relative slip between the front and rear wheels. While these types of prior systems relatively quickly respond to and correct relative slip conditions between the front and rear wheels in many situations, they suffer from some drawbacks.

One drawback associated with these prior systems is that the control systems often cause excessive clutch cycling when the vehicle is being operated in conditions where the wheels experience slippage for an extended period of time, such as in sand, mud, or deep snow. This excessive clutch cycling generates relatively high amounts of heat which can cause excessive wear and potential damage to the clutch components.

Efforts have been made to reduce excessive clutch cycling in these situations by monitoring the clutch duty cycle and causing the transfer case to enter into a "locked" four-wheel drive operating mode (e.g., a four-wheel high mode) if the clutch duty cycle waveform corresponds to an excessive cycling condition. One drawback with this type of system is that it does not accurately account for or reflect the amount of heat generated within the transfer case clutch, which is a primary cause of clutch wear and damage. Particularly, since these types of prior systems monitor only clutch duty cycle, they do not properly account for the degree of slip and loading conditions which are determinative of the amount of heat generated by the clutch.

There is therefore a need for a system and method for controlling a transfer case within an automatic four-wheel drive vehicle which utilizes a thermal model to detect high load and high slip conditions, and to switch the transfer case into a "locked" four-wheel high operating mode in response to such a detection, thereby preventing excessive wear and potential damage to the transfer case clutch.

SUMMARY OF THE INVENTION

It is a first object of the invention to provide a system and method for controlling a transfer case within a four-wheel drive vehicle which overcomes at least some of the previously delineated drawbacks of the prior systems, devices, and/or methods.

It is a second object of the invention to provide a system and method for controlling a transfer case within an automatic four-wheel drive vehicle which accurately detects high load and high slip conditions and which is effective to switch the transfer case into a "locked" four-wheel drive operating mode in response to such a detection, thereby preventing excessive wear and potential damage to the transfer case clutch.

It is a third object of the invention to provide a system and a method for controlling a transfer case within an automatic four-wheel drive vehicle which utilizes a thermal model to detect high load and high slip conditions and which is effective to switch the vehicle's transfer case into a "locked" four-wheel drive operating mode in response to such a detection.

According to a first aspect of the present invention a system is provided for controlling a transfer case. The transfer case is operatively disposed within a four-wheel drive vehicle of the type having a selectively positionable throttle, a front driveshaft which rotates at a first speed, and a rear driveshaft which rotates at a second speed. The transfer case is also adapted to selectively provide torque to the front and the rear driveshaft and to selectively operate in an automatic four-wheel drive mode and in a locked four-wheel drive mode. The system includes a first sensor which measures the first speed and which generates a first signal representing the first speed; a second sensor which measures the second speed and which generates a second signal representing the second speed; a third sensor which measures a position of the throttle and which generates a third signal representing the throttle position; and a controller which is communicatively coupled to the transfer case, to the first sensor, and to the second sensor, which receives the first, second, and third speeds, which utilizes the first signal and the second signal to calculate a delta shaft speed and which utilizes the delta shaft speed and the third signal to estimate an amount of heat generated by the clutch, the controller being further effective, when operating in the automatic four-wheel drive mode, to automatically switch from the automatic four-wheel drive mode to the locked four-wheel drive mode when the estimated amount of heat exceeds a predetermined threshold value.

According to a second aspect of the present invention, a method is provided for controlling a transfer case which is operatively disposed within a four-wheel drive vehicle and which includes a clutch which selectively transfers torque to a front driveshaft and a rear driveshaft, the transfer case being operable in an automatic four-wheel drive mode and a locked four-wheel drive mode. The method includes the steps of: monitoring a delta shaft speed; monitoring a position of the throttle; estimating an amount of heat generated in the clutch by integrating a function which is based upon the delta shaft speed and the position of the throttle over a predetermined number of consecutive intervals of time; determining if the estimated amount of heat exceeds a predetermined threshold value over each of the consecutive intervals of time; and automatically switching the transfer case into the locked four-wheel drive mode if the estimated amount of heat exceeds the predetermined threshold value over each of the consecutive intervals of time.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
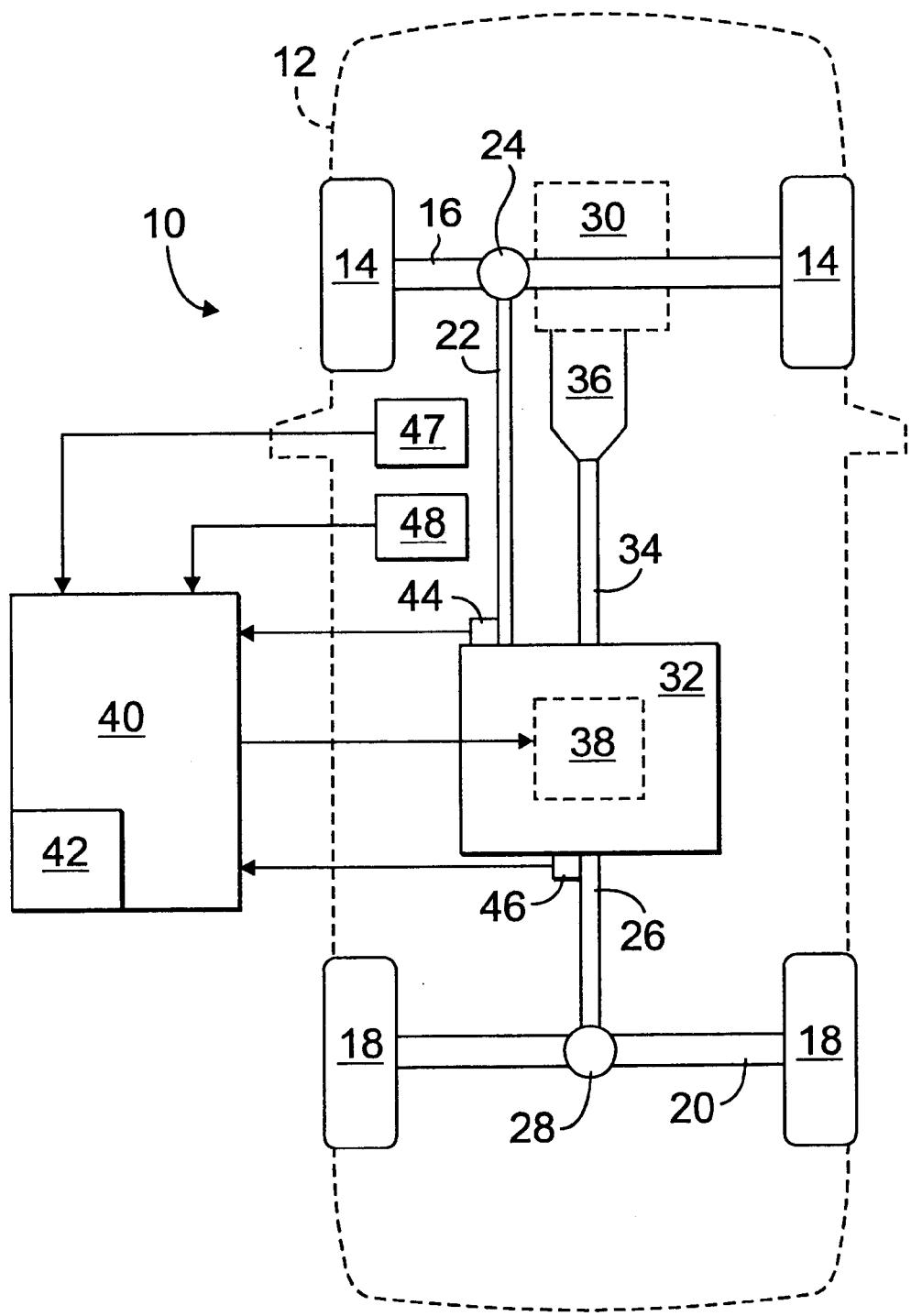
FIG. 1 is a schematic diagram of a four-wheel drive vehicle including a control system which incorporates the teachings of the preferred embodiment of the invention.

Referring now to FIG. 1, there is shown a transfer case control system or apparatus 10 made in accordance with the teachings of the preferred embodiment of the invention. As shown, system 10 is deployed upon a four-wheel drive vehicle 12 having a pair of front wheels 14 which are operatively mounted upon a front axle 16, and a pair of rear wheels 18 which are operatively mounted upon a rear axle 20. Front axle 16 is operatively coupled to and receives torque and power from a front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle engine 30 through the transfer case 32. Particularly, torque and/or power generated by the engine 30 is delivered to transfer case 32 through an input shaft 34 which is coupled to the transmission system or assembly 36. Rear driveshaft 26 is coupled to the transmission assembly 36 and continuously receives torque from the input shaft 34. Transfer case 32 includes a conventional electromagnetic clutch assembly 38 which selectively transfers torque to the front driveshaft 22, thereby reducing the torque supplied to the rear driveshaft 26. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as the primary driveshaft).

Transfer case control system 10 includes a conventional microcontroller or controller 40 having a memory unit 42 and operating under stored program control. Controller 40 is electrically, physically, and communicatively coupled to sensors 44–47, driver-operated control 48, and clutch assembly 38. Controller 40 receives signals generated by sensors 44–47, processes and utilizes the received signals to determine the amount of torque which is to be respectively provided to front and rear driveshafts 22, 26, and based upon this determination, generates a command signal to selectively activate the clutch assembly 38, thereby selectively distributing torque to the front driveshaft 22 from the rear driveshaft 26.

In the preferred embodiment, controller 40 is a conventional powertrain controller including one or more microprocessors and subprocessors which cooperatively perform the below-described calculations, subroutines and/or processes. In the preferred embodiment, controller 40 generates a pulse-width-modulated ("PWM") signal which controls the amount of slippage between plates of the clutch assembly 38, thereby controlling the amount of torque and power which is transferred to front driveshaft 22 from the rear driveshaft 26. Particularly, the duty cycle of the PWM signal (i.e., the amount or percentage of the cycle time for which the signal is activated or "enabled") controls the amount of torque which is being transferred to the respective driveshafts 22, 26.

In the preferred embodiment of the invention, memory 42 is a conventional memory unit including both permanent and temporary memory, and is adapted to and does store at least a portion of the operating software which directs the operation of controller 40. Moreover, memory 42 is adapted to selectively store other types of data or information, including information associated with the operation of the preferred embodiment of the invention and/or associated historical data, processing data, and/or operational data. As will be more fully discussed below, examples of such data include, but are not limited to, data relating to the speed of driveshafts 22, 26, the difference in the speed of driveshafts 22, 26, referred to as the "delta shaft speed", and other engine operating data, which are used by controller 40 to determine the amount of torque that should be provided to driveshafts 22, 26. Memory 42 also stores various mathematical constants, threshold values, and operating strategies (e.g., such as a conventional proportional and integral operating strategy) which are selectively utilized to calculate a control output signal. As should also be apparent to those of ordinary skill in the art, controller 40 and memory 42 may actually comprise several commercially available, conventional, and disparate chips or devices, which are operatively and communicatively linked in a cooperative manner.

Controller 40 selectively operates in several different "modes", based upon the position of user-operated control 48, which comprises a conventional and commercially available selectively positionable mode select switch or shifter, which allows a user to select between the various operating modes. In the preferred embodiment, the control 48 allows a user to selectively place the transfer case controller 40 in either two-wheel drive "2WD" operating mode; an automatic four-wheel drive "A4WD" operating mode; a four-wheel drive high operating mode "4HI"; and a four-wheel drive low operating mode "4LO". In 2WD mode, the transfer case clutch 38 is substantially disengaged at all times, and all of the torque from the transmission 36 is delivered to the primary or rear driveshaft 26. In A4WD mode, the transfer case 32 acts as a "on demand" type transfer case and selectively controls the amount of torque and power which is transferred to front driveshaft 22 from the rear driveshaft 26, based upon one or more conventional operating strategies (e.g., such as a proportional and integral strategy), and which utilizes the signals received from sensors 44–47 to determine the duty cycle provided to clutch 38. In 4HI mode, the transfer case clutch is essentially "locked" (e.g., the clutch duty cycle is approximately 98%), thereby continuously providing torque to all four-wheels, and the gearing ratio between the input shaft and the primary and secondary driveshafts is approximately 1 to 1. In 4LO mode, the transfer case clutch is essentially "locked" (e.g., the clutch duty cycle is approximately 98%), thereby continuously providing torque to all four-wheels, and the gearing ratio between the input shaft and the primary and secondary driveshafts is approximately 2.5 to 1. As more fully and completely described below, system 10 implements an "autolock" strategy that is effective to cause the controller 40 to automatically exit A4WD mode and enter into 4HI mode based upon a thermal model which represents certain situations that could potentially cause excessive wear and/or heat damage to the clutch 38, thereby protecting the clutch 38.

Sensors 44 and 46 comprise conventional and commercially available sensors which respectively measure the rotational speed of the front driveshaft 22 and the rear driveshaft 26, and which generate and communicate signals representing these measured speeds to controller 40. In an alternate embodiment, the vehicle speed can be provided by an antiskid braking system ("ABS") module of the vehicle. In the preferred embodiment, sensor 47 comprises at least one throttle position sensor which measures and/or detects the position of the vehicle's throttle and which transmits a signal representing this position to controller 40.

Sensors 44–47 provide data representing the above-delineated measured values to controller 40, which utilizes these values, in a known and conventional manner, to generate a PWM signal to transfer case 32 and/or clutch assembly 38, thereby selectively controlling the power and torque which is provided to driveshafts 22 and 26. It should be appreciated that sensors 44–47 may include filtering and/or processing devices or circuits (e.g., low pass, high pass, and/or band pass filters) which filter and/or process the measured or sensed data prior to sending the data to controller 40.

Figure 2:
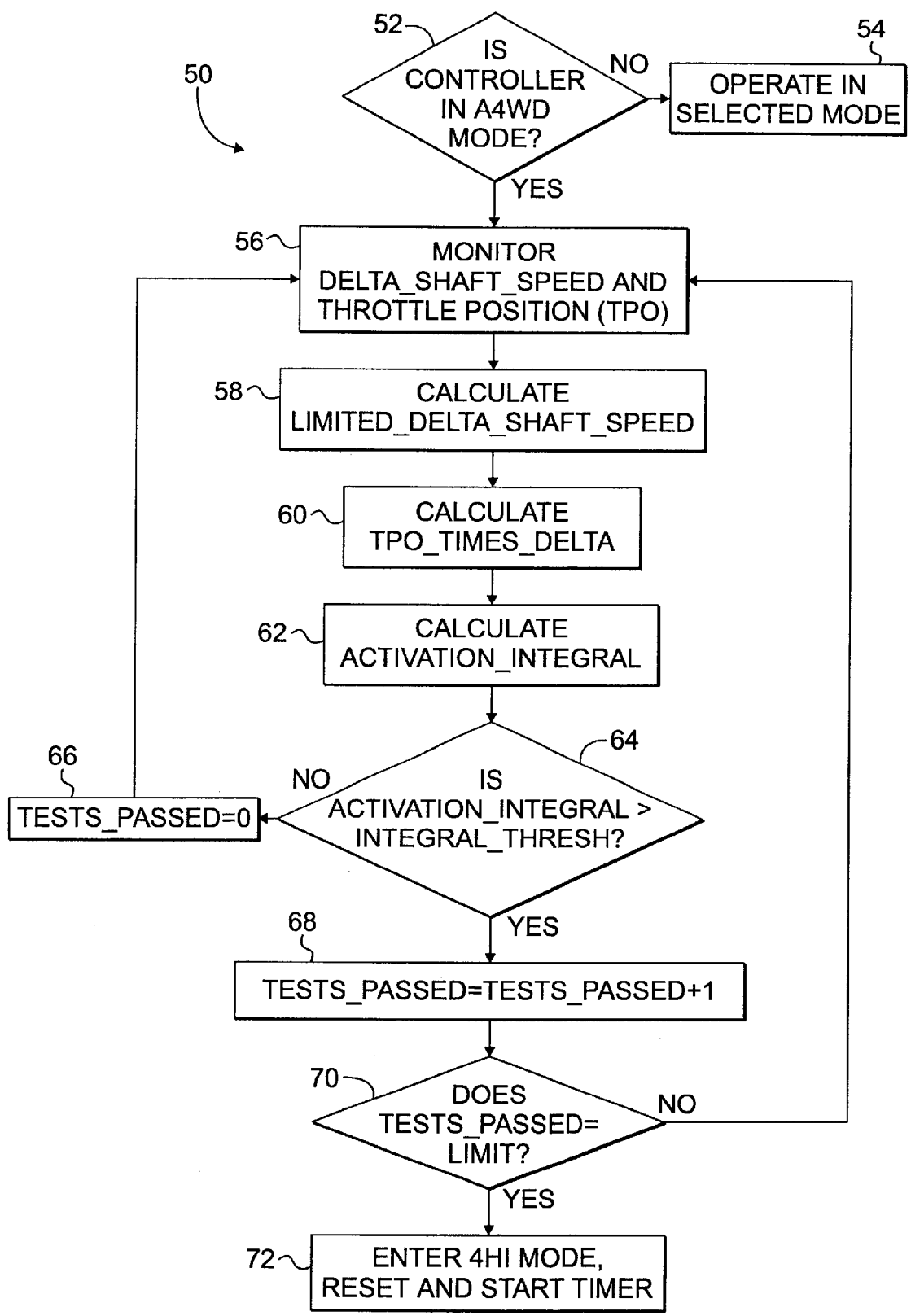
FIG. 2 is a block diagram illustrating the functionality of the "autolock" strategy of the control system shown in FIG. 1.

Referring now to FIG. 2, there is shown a flow diagram 50 illustrating the autolock strategy or functionality implemented by system 10. As shown, strategy 50 begins with functional block or step 52, where the system 10 determines whether controller 40 is in A4WD mode. If the controller 40 is not in A4WD mode, strategy 50 proceeds to functional block or step 54, and the controller 40 continues to operate in the current selected or chosen mode (e.g., 2WD, 4HI, or 4LO). Otherwise, strategy 50 proceeds to functional block or step 56, where the controller 40 calculates and monitors the "delta shaft speed" and the throttle position ("tpo"). Particularly, controller 40 calculates the delta shaft speed ("delta_shaft_speed") by subtracting the speed of the front driveshaft 22 from the speed of the rear driveshaft 26. In one non-limiting embodiment, delta_shaft_speed represents the absolute value of this difference.

In functional block or step 58, the controller 40 limits the delta shaft speed to remove transients. Particularly, controller calculates a limited value ("limited_delta_shaft_speed") as follows:

if (AL2_DELTA_THRESHOLD<delta_shaft_speed<AL2_DELTA_LIMIT), then limited_delta_shaft_speed=delta_shaft_speed, else if (delta_shaft_speed<=AL2_DELTA_THRESHOLD OR front_shaft_speed=0), then limited_delta_shaft_speed=0, else limited_delta_shaft_speed=AL2_DELTA_LIMIT, where front_shaft_speed is the measured speed of the front driveshaft 22; and AL2_DELTA_THRESHOLD and AL2_DELTA_LIMIT are calibratable parameters. This limited value ("limited_delta_shaft_speed") is then used to approximate the heat generated by clutch 38, in functional block or step 60.

In step 60, controller 40 utilizes a thermal model to estimate the heat generated by clutch 38 as a function of the difference in shaft speeds and the pressure applied to the clutch 38 (e.g., HEAT=f (Pressure, $\Delta$ Velocity)). In the preferred embodiment of the invention, $\Delta$ Velocity is approximated by the limited_delta_shaft_speed and the pressure applied to clutch 38 is approximated by the measured throttle position ("tpo"). Specifically, the controller estimates the heat generated by clutch 38 as follows:

tpo_times_delta=limited_delta_shaft_speed*

(adjusted_%tpo−tpo_design_min)

where tpo_times_delta represents "Pressure" multiplied by $\Delta$ Velocity; adjusted_%tpo is the adjusted throttle position or the percentage that the throttle is depressed; and tpo_design_min which is a minimum throttle position for the vehicle.

Figure 4:
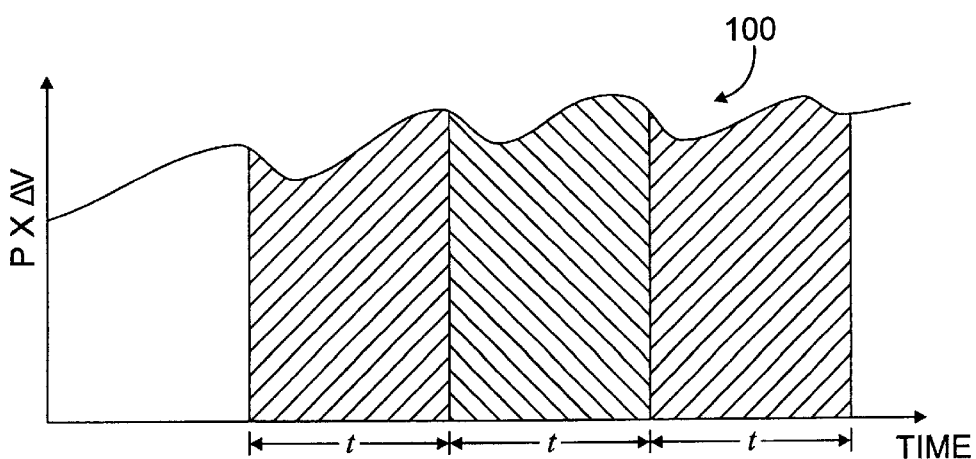
FIG. 4 is a graphical representation of the integration function which is performed by the control system shown in FIG. 1 and which is used to estimate the amount of heat generated by the vehicle's transfer case clutch.

Controller 40 calculates the tpo_times_delta value over a time interval or test period "t", and in functional block or step 62, controller 40 integrates tpo_times_delta over test period "t" in a conventional manner, thereby yielding an integral value ("activation_integral") which is representative of the heat generated by clutch 38 during the test period. A graphical representation of one non-limiting embodiment of this integration function is shown in graph 100 of FIG. 4. In graph 100 the "y"-axis represents the tpo_times_delta values or ("P×$\Delta$V"); the "x"-axis represents time; and the shaded or "cross-hatched" areas represent the activation_integral values over consecutive time periods "t".

In one alternate embodiment, controller uses the duty cycle transmitted to clutch 38 to estimate pressure "P", rather than the throttle position "tpo". In this alternate embodiment, controller 40 multiplies the clutch duty cycle by the limited_delta_shaft_speed over time and integrates this value over the time periods "t" to determine the activation integral value.

Once controller 40 determines the activation_integral value, controller 40 proceeds to functional block or step 64, where it compares the value of the activation_integral to a predetermined threshold value "integral_thresh". If the activation_integral value does not exceed the integral_thresh value, controller 40 proceeds to functional block or step 66, and sets the variable "tests_passed" equal to zero. Controller 40 then repeats steps 56–64.

If the controller 40 determines in step 64 that the activation_integral value exceeds the integral_thresh value, controller 68 proceeds to functional block or step 68 and sets the variable tests_passed, which has an initial value of zero, equal to tests_passed plus one (i.e., tests_passed= tests_passed+1). In functional block or step 70, controller 40 determines if tests_passed is equal to a test limit value "limit"), which in one non-limiting embodiment is equal to three. In other alternate embodiments, the limit value is equal to a number greater than or less than three. If tests_passed is not equal to the limit value, controller 40 repeats steps 56–68. It should be appreciated that in the preferred embodiment, the activation_integral value must exceed the integral_thresh value three consecutive times before controller 40 will proceed to functional block or step 72, where controller 40 automatically switches from A4WD mode to "autolock" or 4HI mode. Hence, controller 40 substantially eliminates the effect of transients and ensures that the clutch is in fact subject to a significant amount of heat generation before switching or "locking" into 4HI mode. In one non-limiting embodiment, controller 40 will reset the "tests_passed" variable or counter to zero if, at any time, the vehicle's speed exceeds a certain calibratible threshold. In another non-limiting embodiment that is used in combination with vehicle having engine and brake traction control systems, controller 40 will reset the "tests_passed" variable or counter to zero if, at any time, the vehicle's throttle position exceeds a certain calibratible threshold and the measured or estimated torque of the rear driveshaft is less than another calibratible threshold.

Figure 3:
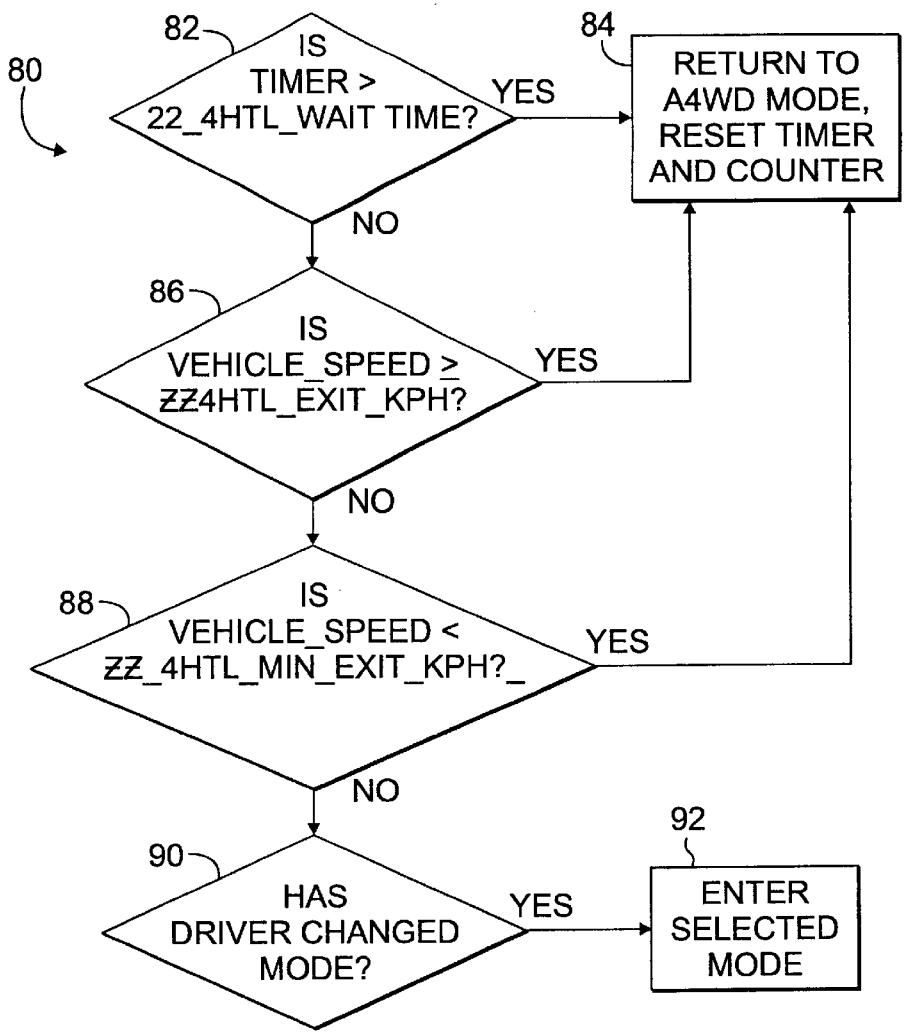
FIG. 3 is a block diagram illustrating the strategy used by the control system shown in FIG. 1 to exit the "locked" four-wheel drive high mode.

Once controller 40 switches to "autolock" or 4HI mode, the controller will remain in 4HI mode until any one of several conditions is met. In the preferred embodiment, the strategy used by controller 40 to exit autolock is illustrated by flow diagram 80 of FIG. 3. Controller 40 begins the exit strategy with functional block or step 82, where controller 40 monitors an internal timer or timing mechanism. Once a predetermined threshold of time ("22_4HTL_WAIT TIME") elapses, controller 40 returns to A4WD mode, as illustrated by functional block or step 84. In step 84, controller 40 further resets the timer and the "tests_passed" counter.

If the predetermined threshold of time has not elapsed, controller 40 proceeds to functional block or step 86, where controller 40 monitors the vehicle speed, which in one non-limiting embodiment is determined by using the slowest speed of the two driveshafts 22, 26. If the measured vehicle speed exceeds or becomes equal to a predetermined maximum exit threshold value ("ZZ4HTL_EXIT_KPH"), controller 40 returns to A4WD mode and resets the timer and the "tests_passed" counter. Controller 40 also returns to A4WD mode and resets the timer and the "tests_passed" counter if the measured vehicle speed falls below a predetermined minimum exit threshold value ("ZZ_4HTL_MIN_EXIT_KPH"), as shown in functional block or step 88. In one non-limiting embodiment the vehicle speed measured and compared in step 88 is determined by the speed of the rear driveshaft 26. Finally, in step 90, controller determines whether the driver of the vehicle has intentionally and/or manually changed operating modes (e.g., by use of control 48), and if so, controller 40 proceeds to step 92 and enters into the selected operating mode.

It should be appreciated that the foregoing system provides significant advantages over prior systems. For example and without limitation, the "autolock" strategy of the present system is specifically based upon a measure or estimate of heat generated in the transfer case clutch 38 (e.g., HEAT=f (Pressure, Δ Velocity)), which is the primary cause of clutch wear and damage. System 10 accounts for the fact that high pressure and high delta shaft speeds combined generate the greatest amount of heat (e.g., high pressure or high delta shaft speeds alone will not generate heat). Hence, the present system provides more reliable protection against potential wear and damage to clutch 38 than prior systems that monitor only clutch duty cycle and do not account for the degree of slip and loading conditions which are determinative of the heat generated by the clutch. Moreover, the present system 10 utilizes conventional existing sensory inputs (i.e., shaft speed and throttle position inputs) to accurately model the thermal conditions of the transfer case clutch, and thus does not require the addition of new hardware or sensory components.

It should be further appreciated that in alternate embodiments, the above-described functional steps may be performed in a different order or procedure, and may include other additional subroutines and/or procedures which are used in conjunction with the functional steps described herein. It is understood that the various inventions are not limited to the exact construction illustrated and described above, but that these previously delineated inventions may be varied without departing from the scope of the inventions as described in the following claims.

What is claimed is:

1. A system for controlling a transfer case which is operatively disposed within a four-wheel drive vehicle of the type having a selectively positionable throttle, a front driveshaft which rotates at a first speed, and a rear driveshaft which rotates at a second speed, said transfer case being adapted to selectively provide torque to said front and said rear driveshaft and to selectively operate in an automatic four-wheel drive mode and in a locked four-wheel drive mode, said system comprising:

a first sensor which measures said first speed and which generates a first signal representing said first speed;

a second sensor which measures said second speed and which generates a second signal representing said second speed;

a third sensor which measures a position of said throttle and which generates a third signal representing said position; and a controller which is communicatively coupled to said transfer case and to said first sensor and to said second sensor, which receives said first, second, and third speeds, which utilizes said first signal and said second signal to calculate a delta shaft speed and which utilizes said delta shaft speed and said third signal to estimate an amount of heat generated by said transfer case, said controller being further effective, when operating in said automatic four-wheel drive mode, to automatically switch from said automatic four-wheel drive mode to said locked four-wheel drive mode when said estimated amount of heat exceeds a predetermined threshold value.

2. The system of claim 1 wherein said controller estimates said amount of heat for at least two consecutive time intervals and requires said amount of heat to exceed said predetermined threshold value for each of said consecutive time intervals prior to switching from said automatic four-wheel drive mode to said locked four-wheel drive mode.

3. The system of claim 1 wherein said controller estimates said amount of heat by integrating a function which is based upon said delta shaft speed multiplied by said throttle position over at least one time interval.

4. The system of claim 1 wherein said locked four-wheel drive mode comprises a four-wheel drive high mode.

5. The system of claim 1 wherein said controller is further adapted to exit said locked four-wheel drive mode after a predetermined period of time expires.

6. The system of claim 5 wherein said controller is further adapted to exit said locked four-wheel drive mode if said vehicle exceeds a first predetermined threshold speed.

7. The system of claim 6 wherein said controller is further adapted to exit said locked four-wheel drive mode if said vehicle falls below a second predetermined threshold speed.

8. The system of claim 1 further comprising a user-operated control which is communicatively coupled to said controller and which allows a user to manually switch between said automatic four-wheel drive mode and said locked four-wheel drive mode.

9. A method for controlling a transfer case which is operatively disposed within a four-wheel drive vehicle and which includes a clutch which selectively transfers torque to a front driveshaft and a rear driveshaft and a selectively positionable throttle, said transfer case being operable in an automatic four-wheel drive mode and a locked four-wheel drive mode, said method comprising the steps of:

monitoring a delta shaft speed;

monitoring a position of said throttle;

estimating an amount of heat generated in said clutch by integrating a function which is based upon said delta shaft speed and said position of said throttle over a predetermined number of consecutive intervals of time;

determining if said estimated amount of heat exceeds a predetermined threshold value over each of said consecutive intervals of time; and automatically switching said transfer case into said locked four-wheel drive mode if said estimated amount of heat exceeds said predetermined threshold value over each of said consecutive intervals of time.

10. The method of claim 9 further comprising the step of determining that said transfer case is operating in said automatic four-wheel drive mode prior to monitoring said delta shaft speed and said throttle position.

11. The method of claim 10 further comprising the steps of limiting said delta shaft speed prior to estimating said amount of heat.

12. The method of claim 11 wherein said predetermined number of consecutive intervals of time comprises three consecutive intervals of time.

13. The method of claim 10 further comprising the step of automatically switching said transfer case back to said automatic four-wheel drive mode from said locked four-wheel drive mode after a predetermined period of time expires.

14. The method of claim 13 further comprising the step of automatically switching said transfer case back to said automatic four-wheel drive mode from said locked four-wheel drive mode if said vehicle exceeds a first predetermined threshold speed.

15. The method of claim 14 further comprising the step of automatically switching said transfer case back to said automatic four-wheel drive mode from said locked four-wheel drive mode if said vehicle falls below a second predetermined threshold speed.

16. The method of claim 15 wherein said locked four-wheel drive mode comprises a four-wheel drive high mode.

17. A method for controlling a transfer case which is operatively disposed within a four-wheel drive vehicle of the type having a primary driveshaft and a secondary driveshaft, said transfer case being adapted to selectively provide torque to said primary driveshaft and said secondary driveshaft, said method comprising the steps of:

measuring a first speed of said primary driveshaft;

measuring a second speed of said secondary driveshaft;

calculating a delta shaft speed by subtracting said second speed from said first speed;

monitoring a duty cycle supplied to said clutch;

estimating an amount of heat produced in said transfer case as a function of said delta shaft speed and said duty cycle;

determining whether said estimated amount of heat exceeds a certain threshold value; and automatically switching said transfer case from an automatic four-wheel drive operating mode to a locked four-wheel drive operating mode if said estimated amount of heat exceeds said certain threshold value.

18. The method of claim 17 wherein said amount of heat is estimated by integrating a function based upon said delta shaft speed multiplied by said duty cycle.

19. The method of claim 18 further comprising the step of automatically switching said transfer case back to said automatic four-wheel drive operating mode from said locked four-wheel drive operating mode after a predetermined interval of time has elapsed.

20. The method of claim 19 wherein said locked four-wheel drive operating mode comprises a four-wheel drive high operating mode.

* * * * *